Nov. 22, 1932.   P. H. ROOT   1,888,572

LAWN MOWER SHARPENING MACHINE

Filed March 2, 1932   2 Sheets-Sheet 1

Inventor
PERCY H. ROOT.
Kwa Hudson & Kent
attys.

Nov. 22, 1932.     P. H. ROOT     1,888,572
LAWN MOWER SHARPENING MACHINE
Filed March 2, 1932      2 Sheets-Sheet 2
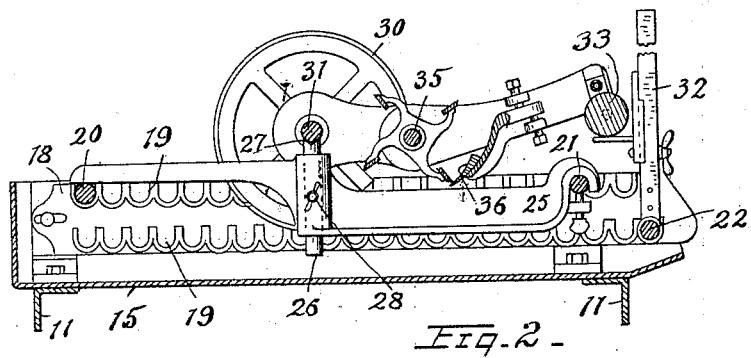
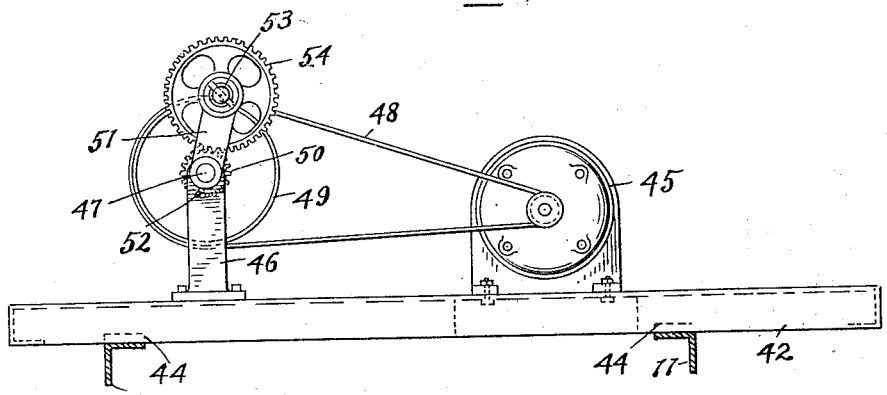
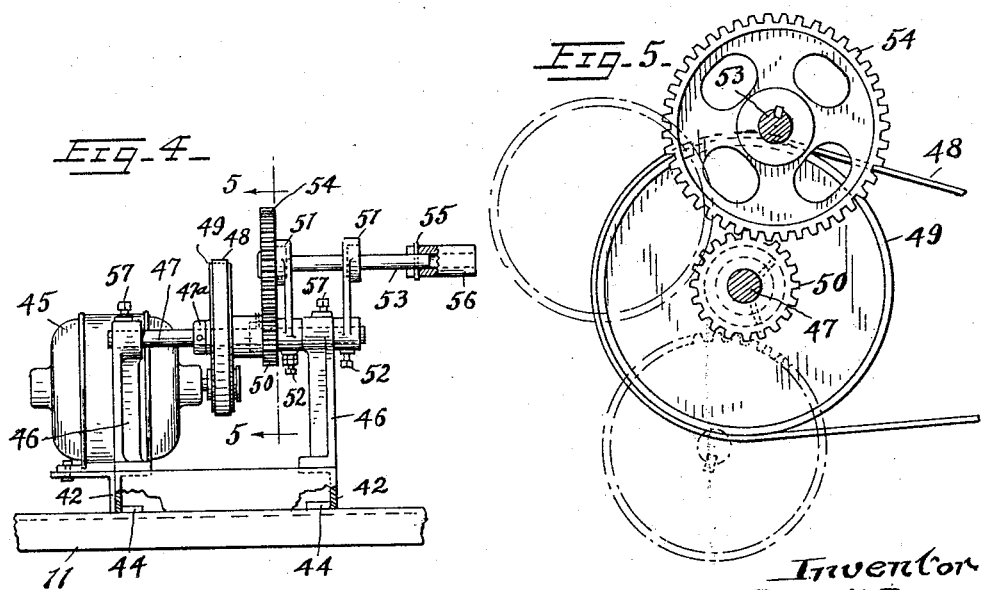
Inventor
PERCY H. ROOT.
Kris Hudson & Kent
attys Patented Nov. 22, 1932

1,888,572

UNITED STATES PATENT OFFICE

PERCY H. ROOT, OF PLYMOUTH, OHIO, ASSIGNOR TO THE FATE-ROOT-HEATH COMPANY, OF PLYMOUTH, OHIO, A CORPORATION OF OHIO

LAWN MOWER SHARPENING MACHINE

Application filed March 2, 1932. Serial No. 596,265.

This invention relates to a machine for sharpening lawn mowers, and particularly to a power-driven machine of the type in which the cutter head assembly of the lawn mower is placed in a machine and the mower is sharpened or reconditioned by rotating the reel of the mower and lapping the reel and cutter bar together with emery paste.

It has been found that there is considerable variation in size and arrangement of the parts in different makes and models of lawn movers, and that a sharpening machine which has a driving mechanism which is positioned to fit some lawn mowers will not fit others.

It is one of the objects of the present invention to provide a sharpening machine having a driving mechanism which can be readily and easily adjusted to fit different makes and models of lawn mowers.

Other objects of the invention and features of novelty will be apparent from the following description, taken in connection with the accompanying sheet of drawings, in which Fig. 1 is a perspective view of one form of sharpening machine embodying my invention;

Fig. 2 is a partial sectional view taken along the line 2—2 of Fig. 1;

Fig. 3 is a side elevational view of the driving mechanism embodied in the machine shown in Fig. 1;

Fig. 4 is an end view of the driving mechanism shown in Fig. 3; and

Fig. 5 is an enlarged view of a portion of the driving mechanism taken along the line 5—5 of Fig. 4.

Figure 1:
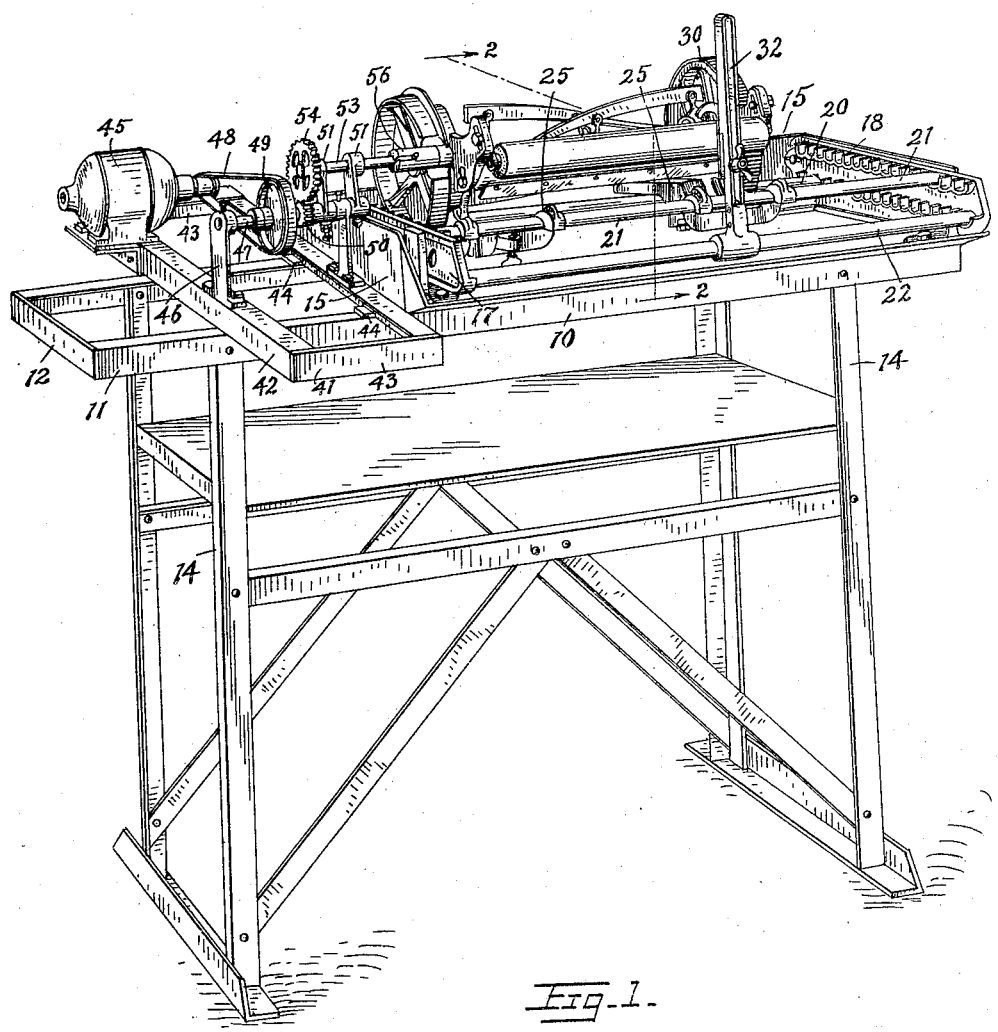

Referring to the drawings, it will be seen that the machine provided by my invention includes a frame, and that the power driving mechanism and means for supporting the mower head are mounted on this frame.

The frame, which is indicated generally by the reference character 10, is preferably constructed of angle iron of suitable size, and includes side members 11 and end members 12, which may be welded, riveted, or otherwise secured together. If desired, the frame may be supported on a stand, which is indicated generally by the reference character 14, and which may be constructed of any suitable material, as, for instance, angle iron.

A sheet metal pan 15 is attached to the frame adjacent one end, and a pair of racks 17 and 18 are positioned inside of the pan and secured to the frame. In the construction shown in the drawings, each of the racks 17 and 18 is provided with two rows of notches, as at 19, which are adapted to receive the cross rods 20, 21 and 22. While the members 20, 21 and 22 are shown as round rods, it should be understood that the invention is not limited to this construction. A pair of arms 25 are supported by the rods 20 and 21 in a manner that permits the arms to be moved lengthwise of the rods. Each of the arms 25 is provided with a member 26 having its top face recessed as at 27. The members 26 are preferably adjustable vertically, and may be held by means of thumb screws 28.

When the cutter head of the mower, which is generally indicated by the reference character 30, is placed in the machine, the tie bar 31 of the cutter head rests on the members 26, while roller 33 or the back part of the cutter head is supported by the member 32 which is secured to the rod 22. This provides a simple and efficient supporting means for the mower head. To place the head in position, it is only necessary to set the head down so that the tie bar 31 rests on the members 26 and to place the member 32 under the roller 33. This provides a three-point support so that the cutter head will not rock while the weight of the head is sufficient to hold it in place. It will be seen that the rods 20, 21 and 22 can be placed in different notches 19 and that the members 26 can be adjusted to different heights, so that mowing machines of different sizes or makes can be readily accommodated. It will also be seen that the racks 17 and 18 are spaced apart and that the arms 25 are adjustable on the rods 20 and 21 so that lawn mowers of different widths can be placed in the machine.

It will be seen from the drawings that one wheel of the lawn mower is removed before the mower is placed in the sharpening machine. This exposes one end of the axle 35 of the reel of the mower and permits the reel to be driven directly rather than through gearing of the mower.

As shown in Fig. 1 of the drawings, the driving mechanism for the sharpening machine is positioned adjacent the left end of the frame 10. The driving mechanism is provided with a frame, indicated generally at 41, which is mounted so as to slide transversely of the frame 10. The frame 41 may be constructed of pieces of angle iron, including side members 42 and end pieces 43, which can be secured together in any suitable manner, as by welding or riveting. The frame 41 is preferably somewhat longer than the width of the frame 10. Lugs or projections, as at 44, are secured to the top of the frame 10 and are positioned so as to engage the inner faces of the side members 42 and guide the frame 41 as it is moved across the frame 10.

An electric motor 45 is secured adjacent one end of the frame 41. A pair of brackets 46 are secured adjacent the other end of this frame and support the shaft 47. The shaft 47 is somewhat longer than the distance between the two brackets and projects from one of the brackets. A pulley 49 is fitted on the shaft 47 between the brackets 46, while a belt 48 connects the motor with the pulley 49. The pulley is secured against axial movement by the collar 47ª. There is mounted on the shaft 47 a pinion 50, which is either integral with or rigidly secured to the hub of the pulley 49. Both the pulley and the pinion are free to turn on the shaft 47, and together form what may be called the driving member.

A pair of arms 51 are also fitted on the shaft 47, one between and one outside of the brackets 46. These arms are rigidly secured to the shaft 47, being held by the set screws 52. A shaft 53, which is the driven member, is mounted in the ends of the arms 51. A gear 54 is secured to the shaft 53 and meshes with the pinion 50 so that rotation of the pulley 49 causes the shaft 53 to turn. A shield or covering, not shown, for the gears 50 and 54 may be secured to one of the set screws 52.

The shaft 53 projects from one of the arms and has a pin 55 fitted therein. This pin engages a slot in the coupling member 56, which member is adapted to engage the end of the axle 35 of the reel of the mowing machine, so that the reel will be turned by the shaft 53. In order that the sharpener will operate properly, it is necessary to have the axis of the shaft 53 and the axis of the axle of the reel substantially in alignment, and the sharpener provided by my invention incorporates means to adjust the driving shaft 53 so that it will line up with the axle of the reel.

It will be seen that the driving mechanism of the sharpener provided by my invention can be moved transversely of the main frame, and this permits the shaft 53 to be adjusted horizontally with respect to the axle of the reel. The shaft 53 is adjusted vertically by rotating the shaft 47 which carries the arms 51. When the shaft 47 is rotated, the arms 51 rotate also and this changes the vertical position of the shaft 53, as will be better understood by reference to Fig. 5. Adjustment through a wide range of vertical heights is possible, as the shaft 53 can be swung through almost an entire circle. By combining horizontal and vertical adjustments of the shaft 53, this shaft can be brought into alignment with the axle of the reel of any size or make of mowing machine which is to be sharpened. It will also be seen that the adjustment of the position of the driving shaft is very easily accomplished. The horizontal adjustment is secured by merely sliding the driving mechanism transversely of the main frame, while the vertical adjustment is secured by rotating the arms 51 and the shaft 47. The shaft 47 is held by set screws 57 which are loosened when it is desired to turn this shaft, and which are tightened to hold the shaft 47 after the driving shaft has been adjusted to the proper height.

In operation, one of the wheels of the mowing machine is removed and the cutter head is placed in the sharpening machine in the manner described in detail above. The driving mechanism of the sharpening machine is then adjusted, so that the driving shaft 53 is in alignment with the axle of the reel of the cutter head. The coupling member 56 is then put in place between the shaft 53 and the reel, so that when the shaft 53 of the driving mechanism is turned by the motor 45, the reel of the mowing machine is caused to turn. Emery compound is then brushed on the knives of the reel, and as the reel rotates, the knives of the reel and the cutter bar 36 are lapped together. The lapping or sharpening process may be aided by adjusting the cutter bar 36 a trifle closer to the reel in order that these parts will each be ground down and will better fit each other.

When the cutter head has been in the machine long enough to complete the lapping process, it can be removed merely by disconnecting the coupling member 56 and lifting the cutter head off the supports. If any emery compound remains on the cutter head, it can be removed by washing with gasoline or kerosene. The wheel may then be replaced and the lawn mower will be ready for operation.

From the foregoing, it will be seen that my invention provides a machine for sharpening lawn mowers which is simple and economical to construct and which is easy to operate.

It will also be seen that the machine provided by my invention is adapted to receive any size or model of lawn mower and that the driving mechanism can be readily and quickly adjusted to fit different mowers.

While one form of sharpening machine has been illustrated and described in detail, it should be understood that this invention is not limited to these details but that modifications and changes in the construction may be made without departing from the scope of the appended claims.

Having thus described my invention, I claim:

1. A device for sharpening lawn mowers having, in combination, a frame, means associated with said frame for supporting the cutter head of a lawn mower, and a driving mechanism, said driving mechanism including a pair of interconnected members, one of said members being supported by an arm which is pivoted to swing about the axis of the other of said members, the pivotally mounted member being adapted to rotate the reel of the lawn mower.

2. A device for sharpening lawn mowers having, in combination, a frame, means associated with said frame for supporting the cutter head of a lawn mower, and a driving mechanism, said driving mechanism including a pair of interconnected members, one of said members being supported by an arm which is pivoted to swing about the axis of the other of said members, the pivotally mounted member being adapted to rotate the reel of the lawn mower, and releasable means to prevent swinging of said arm.

3. In a driving mechanism for a lawn mower sharpening machine, a pair of interconnected rotating members mounted on horizontal axes, one of said members being supported by an arm which is pivoted to swing about the axis of the other of said members whereby the power delivery end of said mechanism may be adjusted vertically, and releasable means to prevent swinging of said arm.

4. A device for sharpening lawn mowers having, in combination, a frame, means associated with said frame for supporting the cutter head of a lawn mower, a driving mechanism including a rotating member adapted to rotate the reel of the cutter head, and means to adjust the axis of said rotating member both vertically and horizontally.

5. A device for sharpening lawn mowers having, in combination, a frame, means associated with said frame for supporting the cutter head of a lawn mower, and a driving mechanism including a rotating member adapted to rotate the reel of the cutter head, said rotating member being supported by a bracket which is pivotally mounted.

6. In a driving mechanism for a lawn mower sharpening machine, a driven member and a driving member, said members being operatively connected together, the driven member being supported by an arm which is pivoted to swing about the axis of the driving member for adjustment purposes.

7. A device for sharpening lawn mowers having, in combination, a frame, means associated with said frame for supporting the cutter head of a lawn mower, and a driving mechanism adapted to rotate the reel of the cutter head, the driving mechanism being movable transversely of the axis of the cutter reel, said driving mechanism including a rotating member which is supported by an arm which is pivotally mounted.

8. In a machine for sharpening lawn mowers, a frame, means associated with said frame for supporting the cutter head of a lawn mower, and a driving mechanism adapted to rotate the reel of the cutter head, said driving mechanism being movable transversely of the axis of the cutter reel, and including a pair of rotating members one of which is supported by an arm which is pivoted to swing about the axis of the other of said members.

9. A driving mechanism for a lawn mower sharpening machine having a pair of rotating members including a driven member adapted to turn the reel of a cutter head, and a driving member adapted to turn the driven member, the driven member being supported by an arm which is pivoted to swing about the axis of the driving member for adjustment purposes.

10. In a machine for sharpening lawn mowers, a frame, means associated with said frame for supporting the cutter head of a lawn mower, and a driving mechanism adapted to rotate the reel of the cutter head, said driving mechanism being movable transversely of the axis of the reel of the cutter head and including a driving member and a driven member, the driven member being supported by an arm which is pivotally mounted to swing about the axis of the driving member.

11. In a machine for sharpening lawn mowers, a frame, means associated with said frame for supporting the cutter head of a lawn mower, and a driving mechanism, the driving mechanism being movable transversely of the axis of the reel of the cutter head and including a driving member and a driven member, the driven member being adapted to rotate the reel of the cutter head and being supported by an arm which is pivoted to swing about the axis of the driving member.

12. A device for sharpening lawn mowers having, in combination, a frame, means associated with said frame for supporting the cutter head of a lawn mower, and a driving mechanism including a rotating member adapted to rotate the reel of the cutter head, said rotating member being supported by an arm which is pivotally mounted, said driving mechanism being movable transversely of the axis about which the supporting arm of the rotating member is pivoted.

In testimony whereof, I hereunto affix my signature.

PERCY H. ROOT.

CERTIFICATE OF CORRECTION.

Patent No. 1,888,572.                               November 22, 1932.

PERCY H. ROOT.

It is hereby certified that error appears in the printed specification of the above numbered patent requiring correction as follows: Page 3, after line 65, claim 5, insert the syllable and words "ciated with said frame for supporting the cut-"; and that the said Letters Patent should be read with this correction therein that the same may conform to the record of the case in the Patent Office.

Signed and sealed this 17th day of January, A. D. 1933.

M. J. Moore,
Acting Commissioner of Patents.

(Seal)